(12) United States Patent
Mäkelä et al.

(10) Patent No.: US 10,831,229 B2
(45) Date of Patent: Nov. 10, 2020

(54) PUSH-BUTTON EQUIPMENT, PRESSEL THEREFOR AND PUSH-BUTTON ARRANGEMENT

(71) Applicant: KONE Corporation, Helsinki (FI)

(72) Inventors: Klaus Mäkelä, Helsinki (FI); Mika Hautamäki, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 16/213,430

(22) Filed: Dec. 7, 2018

(65) Prior Publication Data
US 2019/0235563 A1 Aug. 1, 2019

(30) Foreign Application Priority Data
Jan. 29, 2018 (EP) .................................... 18153809

(51) Int. Cl.
*G05G 1/02* (2006.01)
*H01R 13/627* (2006.01)
(Continued)

(52) U.S. Cl.
CPC ............... *G05G 1/02* (2013.01); *H01H 13/14* (2013.01); *H01H 13/705* (2013.01);
(Continued)

(58) Field of Classification Search
CPC ........ G05G 1/02; G05G 2505/00; G05G 5/06; H01R 13/6277; H01R 13/506;
(Continued)

(56) References Cited

U.S. PATENT DOCUMENTS

| 5,144,103 A | 9/1992 | Suwa |
| 7,226,321 B2 * | 6/2007 | Uhari .................... G01D 11/24 439/752 |

(Continued)

FOREIGN PATENT DOCUMENTS

| FR | 2498272 A1 | 7/1982 |
| JP | 2001-52558 A | 2/2001 |

OTHER PUBLICATIONS

Search Report issued in European priority application 18153809.1, dated Jul. 19, 2018.

*Primary Examiner* — Patrick Cicchino
(74) *Attorney, Agent, or Firm* — Birch, Stewart, Kolasch & Birch, LLP

(57) ABSTRACT

A push-button equipment includes a pressel; a mounting collar for being installed on a base, such as a button panel, the mounting collar including a seat for receiving the pressel; the pressel including a pressing face for receiving a press of a user and being insertable in the seat of the mounting collar in a forward direction orthogonal to the pressing face. The pressel is movable in the seat into a locked position by rotating it in the seat around a rotational axis extending in said direction orthogonal to the pressing face. In said locked position the collar blocks the pressel from moving in backwards direction orthogonal to the pressing face out from the seat. A pressel for the push-button equipment and a push-button arrangement of an elevator are also disclosed.

16 Claims, 3 Drawing Sheets

(51) Int. Cl.
  *H01R 13/506*   (2006.01)
  *H01H 13/705*   (2006.01)
  *H01H 13/7057*  (2006.01)
  *H01H 13/14*    (2006.01)
  *F16B 21/04*    (2006.01)
  *B66B 1/52*     (2006.01)

(52) U.S. Cl.
  CPC ....... *H01H 13/7057* (2013.01); *H01R 13/506* (2013.01); *H01R 13/6277* (2013.01); *B66B 1/52* (2013.01); *F16B 21/04* (2013.01); *G05G 2505/00* (2013.01)

(58) Field of Classification Search
  CPC ............. H01H 13/705; H01H 13/7057; H01H 19/003; E05B 55/005; F16B 21/04
  See application file for complete search history.

(56) References Cited

U.S. PATENT DOCUMENTS

| | | | | |
|---|---|---|---|---|
| 8,544,691 | B2* | 10/2013 | Roosel | B05B 11/3049 |
| | | | | 222/153.01 |
| 8,944,838 | B2* | 2/2015 | Mulfinger | G02B 6/3893 |
| | | | | 439/349 |
| 2011/0094869 | A1 | 4/2011 | Dai | |
| 2015/0023759 | A1 | 1/2015 | Klopfenstein, II | |

* cited by examiner

PUSH-BUTTON EQUIPMENT, PRESSEL THEREFOR AND PUSH-BUTTON ARRANGEMENT

FIELD OF THE INVENTION

The invention relates to push-buttons, and particularly to push-buttons of an elevator. The elevator is an elevator for transporting passengers and/or goods.

BACKGROUND OF THE INVENTION

Conventional push-buttons often comprise a pressel comprising a pressing face for receiving a press of a user, as well as a collar comprising a seat for receiving the pressel.

There are known push-buttons where installation of the pressel is possible by inserting the pressel in the seat of the mounting collar in forward direction orthogonal to the pressing face for receiving a press of a user. With this kind of front-mounted pressels the equipment usually comprises a return spring mechanism and pressel locking mechanism, which are separate from each other. In prior art, with front-mounted pressels, the locking is done by push of the pressel in direction orthogonal to the pressing face until a fixing clip snaps over a counterpart abutment, wherein the direction of the push in said locking is parallel to the direction of movement of the pressel during actuation by the user. A drawback of this kind of solution is that it tends to cause additional abrasion in button operation. A further drawback of this kind of solution is that the pressels can be removed with relatively minor effort, because the holding ability of the locking depends on the fixing clip strength, which is difficult to make strong without compromises in space-efficiency and/or said abrasion problems. A further drawback of this kind of solution is that the locking mechanism thereof easily increases the overall thickness of the push-button. Even though the increase in thickness may be very slight, it is relevant because the space is already very limited since also a switching element and an illumination element may need to be fitted to cooperate with the pressel and the collar. All that combined with difficult tolerance chains lead to compromises with size or reliability.

BRIEF DESCRIPTION OF THE INVENTION

The object of the invention is to provide a new push-button equipment, a pressel therefor and a push-button arrangement. An object is particularly to alleviate one or more of the above defined drawbacks of prior art and/or problems discussed or implied elsewhere in the description. A solution is presented, inter alia, by which the overall structure of the push-button is thin. A solution is presented, inter alia, where abrasion caused in button operation can be kept minor. A solution is presented, inter alia, where the holding ability of the locking can be made reliable. A solution is presented, inter alia, where no excessive tilting of the components during installation is necessary which facilitates simplicity of installation from front side of the base, such as a button panel, on which the push-button is to be installed.

It is brought forward a new push-button equipment comprising a pressel; a mounting collar for being installed on a base, such as a button panel, the mounting collar comprising a seat for receiving the pressel; the pressel comprising a pressing face for receiving a press of a user. The pressel is insertable in the seat of the mounting collar in forward direction orthogonal to the pressing face. The pressel is movable in the seat into a locked position by rotating it in the seat around a rotational axis extending in said direction orthogonal to the pressing face, wherein in said locked position the collar blocks the pressel from moving in backwards direction orthogonal to the pressing face out from the seat. With this solution, one or more of the above mentioned advantages and/or objectives are achieved. This construction makes it possible to install the pressel by push and twist. The overall structure can be thin. Moreover, the amount of abrasion during use can be simply made low due to that locking direction deviates from the installation direction.

Preferable further features are introduced in the following, which further features can be combined with the push-button equipment individually or in any combination.

In a preferred embodiment, the collar is arranged to block rotation of the pressel around said rotational axis back from the locked position. This prevents unauthorized removal of the pressel, which for example makes stealing thereof more difficult. It also makes it laborious, or even impossible, to remove the pressel without braking it. Since a new pressel can be mounted without opening the assembly, from maintenance point of view, a worn or a broken pressel can be easily replaced anyways.

In a preferred embodiment, the pressel comprises a first locking member, and the mounting collar comprises a second locking member, and the pressel inserted in the seat is rotatable in the seat to a locked position around a rotational axis extending in direction orthogonal to the pressing face, such that the first locking member rotates to be positioned in direction of said rotational axis behind the second locking member, whereby in said locked position the second locking member blocks the pressel from moving in backwards direction orthogonal to the pressing face out from the seat. This provides simple locking such that area of surfaces (of the pressel and collar) experiencing abrasion in use, i.e. when the pressel is pressed by the user, can be made only small or even completely eliminated.

In a preferred embodiment, the pressel is insertable in the seat of the mounting collar in forward direction orthogonal to the pressing face without tilting the pressel relative to the mounting collar.

In a preferred embodiment, the pressel is movable in the seat into the locked position by rotating it in the seat around a rotational axis extending in said direction orthogonal to the pressing face without tilting the pressel relative to the mounting collar.

In a preferred embodiment, the push-button equipment, preferably the pressel thereof, comprises a returning spring for returning the pressel in backwards direction orthogonal to the pressing face after the pressel has been pressed by a user.

In a preferred embodiment, the pressel comprises a returning spring, and when the pressel is in the locked position, it is movable, in particular by press of a user on the pressing face, in the seat in forward direction orthogonal to the pressing face such that the returning spring is elastically deformed, and in backwards direction orthogonal to the pressing face returned by the returning spring.

In a preferred embodiment, the mounting collar comprises a counterpart member for the returning spring against which the returning spring is tensionable by movement in said forward direction, in particular in said inserting and/or when the pressel is in the locked position.

In a preferred embodiment, the returning spring is a bendable tongue, tensionable by bending, in particular against said counterpart member.

In a preferred embodiment, the returning spring is arranged to slide against said counterpart member in said rotation in a tensioned state.

In a preferred embodiment, the spring comprises a distal end, and the counterpart member comprises an abutment against which the spring is arranged to slide in said rotation in a tensioned state at least until the distal end bypasses an edge of the abutment in direction of said sliding, bypassing of said edge being arranged to allow release of the distal end of the spring to bypass said edge of the abutment in said forward direction to be aligned with the abutment, in particular in tangential direction of the a rotational axis, such that rotation of the spring (and thereby the pressel) in reverse direction is blocked. Thereby, in the solution the returning spring is used for the returning function, and additionally also the function of blocking reverse rotation.

In a preferred embodiment, the returning spring is a curved bendable tongue extending around said rotational axis, preferably with a constant center of curvature, wherein the center of curvature is at the point of said rotational axis.

In a preferred embodiment, the returning spring is a bendable tongue helically extending around said rotational axis. Thereby, it can have a thin structure in said direction orthogonal to the pressing face. It is also simple to manufacture.

In a preferred embodiment, the returning spring extends around said rotational axis an angle which is between 20 and 180 degrees, preferably between 20 and 90 degrees, most preferably between 30 and 70 degrees.

In a preferred embodiment, the pressel comprises plurality, preferably 2-5 of said first locking members, springs cooperating with 2-5, same number of second locking members and counterpart members comprised in the collar.

In a preferred embodiment, the thickness of the second locking member in forward direction orthogonal to the pressing face is smaller than the free space on the side of the first locking member towards which the pressing face faces.

In a preferred embodiment, the pressel comprises a slot on the same side of the first locking member as the pressing face in direction of a rotation axis extending in the direction orthogonal to the pressing face, which slot is open towards tangential direction of the rotational axis extending in direction orthogonal to the pressing face the slot being thereby provided for receiving a second locking member comprised in the mounting collar. The slot is preferably larger in said forward direction orthogonal to the pressing face than the second locking member.

It is also brought forward a new pressel for a push-button equipment as defined in any of the preceding claims, wherein the pressel comprises a pressing face for receiving a press of a user, a first locking member, and a slot on the same side of the first locking member as the pressing face in direction of a rotation axis extending in the direction orthogonal to the pressing face, which slot is open towards tangential direction of the a rotational axis extending in direction orthogonal to the pressing face, the slot being thereby provided for receiving a second locking member comprised in the mounting collar. With this solution, one or more of the above mentioned advantages and/or objectives are achieved. Preferable further features have been introduced in the following as well as in the paragraphs above, which further features can be combined with the pressel individually or in any combination.

In a preferred embodiment, the pressel is suitable for being inserted in a seat of a mounting collar in forward direction orthogonal to the pressing face, and movable in the seat into a locked position by rotating it in the seat around a rotational axis extending in said direction orthogonal to the pressing face.

In a preferred embodiment, the pressel comprises a returning spring.

In a preferred embodiment, the returning spring is an bendable tongue, tensionable by bending.

In a preferred embodiment, the returning spring is a curved bendable tongue extending around said rotational axis, preferably with a constant center of curvature, wherein the center of curvature is at the point of said rotational axis.

In a preferred embodiment, the returning spring is a bendable tongue helically extending around said rotational axis.

In a preferred embodiment, the pressel is made of plastic.

In a preferred embodiment, the pressel is a one-piece structure.

It is also brought forward a new push-button arrangement comprising a push-button equipment according to any of the preceding claims wherein the mounting collar is installed on a base, such as a button panel, the pressel being in the seat of the mounting collar and the pressel in the locked position, wherein in said locked position the collar blocks the pressel from moving in backwards direction orthogonal to the pressing face out from the seat. With this solution, one or more of the above mentioned advantages and/or objectives are achieved. Preferable further features have been introduced in the following as well as in the paragraphs above, which further features can be combined with the arrangement individually or in any combination.

In a preferred embodiment, the base is a button panel of an elevator, preferably installed on a wall of an elevator, which is a wall of an elevator car or a landing wall, or on a stand mounted on a landing.

In a preferred embodiment, the push-button arrangement is a push-button arrangement of an elevator.

In a preferred embodiment, said push button is preferably a push-button for actuating an electric switch.

In a preferred embodiment, the arrangement comprises an electric circuit and an electric switch component actuatable to break or connect an electric circuit, and the pressel is arranged to actuate the electric switch component.

In a preferred embodiment, the arrangement moreover comprises a light source, such as a LED component, arranged to radiate light outside the push-button, preferably through the collar and/or the pressel. Then, it is preferable that pressel and/or the collar is, or at least comprises, a transparent portion which is visible to the user and which can be illuminated by the light source.

In a preferred embodiment, The push button arrangement is preferably connected over an electrical, wired or wireless, connection with the elevator control unit configured to control the elevator car based on state of the push buttons.

In a preferred embodiment, the collar is a ring that can be positioned around the pressel. The seat preferably has inner wall w that is circular or at least substantially circular when viewed in said forward direction orthogonal to the pressing face. The inner wall w can have protrusions protruding towards the center of the circular shape forming the second locking member and the counterpart member, for instance.

In a preferred embodiment, the perimeter of the pressing face is circular when viewed in said forward direction orthogonal to the pressing face.

The elevator is preferably such that it comprises an elevator car vertically movable and configured to serve two or more vertically displaced landings. Preferably, the car has an interior space suitable for receiving a passenger or passengers, and the car can be provided with a door for forming a closed interior space. The elevator is furthermore preferably configured to automatically control movement of the car based on state of push-buttons located at landing(s) and/or inside the elevator car.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

DETAILED DESCRIPTION

Figure 1:
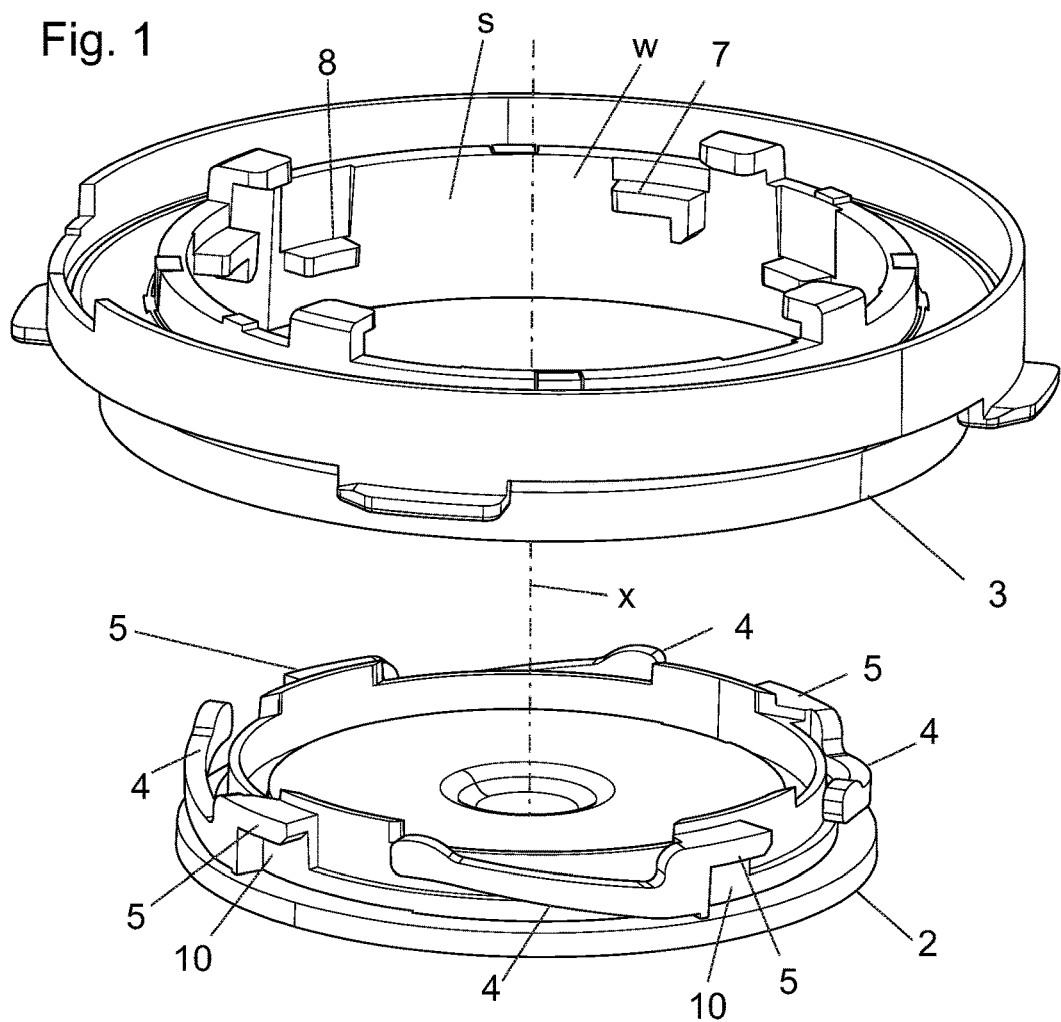
FIG. 1 illustrates the back sides of components of a push-button equipment according to a preferred embodiment when still separate from each other.
Figure 2:
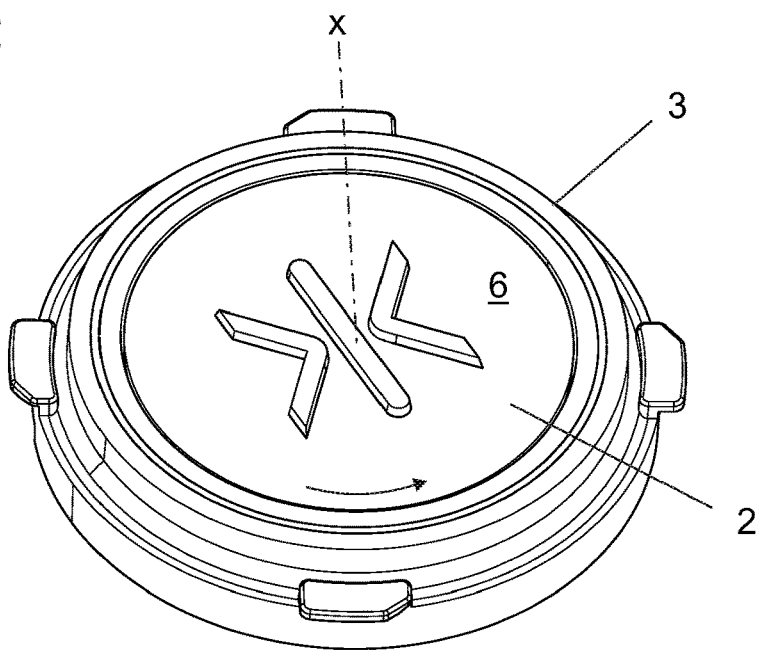
FIG. 2 illustrates the push-button equipment of FIG. 1 when together.

FIGS. 1 and 2 illustrate a push-button equipment, i.e. a set of push-button components, comprising a pressel 2 and a mounting collar 3 for being installed on a base, such as a button panel, the mounting collar 3 comprising a seat s for receiving the pressel 2. The pressel 2 is mountable on the base via the collar 3. The pressel 2 comprises a pressing face 6 for receiving a press of a user. The pressel 2 is insertable in the seat s of the mounting collar 3 in forward direction orthogonal to the pressing face 6. The pressel 2, after being inserted in the mounting collar 3, is movable in the seat s into a locked position by rotating it in the seat s around a rotational axis x extending in said direction orthogonal to the pressing face 6, wherein in said locked position the collar blocks the pressel 2 from moving in backwards direction orthogonal to the pressing face 6 out from the seat. The pressing face 6 of the pressel 2 is visible in FIG. 2. The reference number x marks also the direction orthogonal to the pressing face 6 in the Figures.

FIG. 1 illustrates the pressel 2 and a mounting collar 3 of the push-button equipment from back-side separate from each other. FIG. 2 illustrates the push-button equipment of FIG. 1 in a state where the pressel 2 has been inserted in the seat s of the mounting collar 3 in forward direction orthogonal to the pressing face 6. The arrow illustrates rotation of the pressel 2 inserted in the mounting collar 3 in the seat s into a locked position around the rotational axis x.

The solution of the preferred embodiment makes it possible to install the pressel 2 by push and twist. The construction provides that the overall structure is thin. The construction moreover provides that the amount of abrasion during use can be made low due to that locking direction deviates from the installation direction. Area of surfaces (of the pressel 2 and collar 3) experiencing abrasion in use, i.e. when the pressel 2 is pressed by the user, can be made small or even completely eliminated by designing clearances between the components.

In the preferred embodiment, the pressel 2 comprises a first locking member 5, and the mounting collar 3 comprises a second locking member 8. The pressel 2 inserted in the seat is rotatable in the seat s to a locked position around the rotational axis x extending in direction orthogonal to the pressing face 6, such that the first locking member 5 rotates to be positioned in direction of said rotational axis x behind the second locking member 8, whereby in said locked position the second locking member 8 blocks the pressel 2 from moving in backwards direction orthogonal to the pressing face 6 out from the seat. FIGS. 3-6 illustrate preferred details of the push-button equipment of FIGS. 1 and 2 at different stages of installation as described hereinafter.

Figure 3:
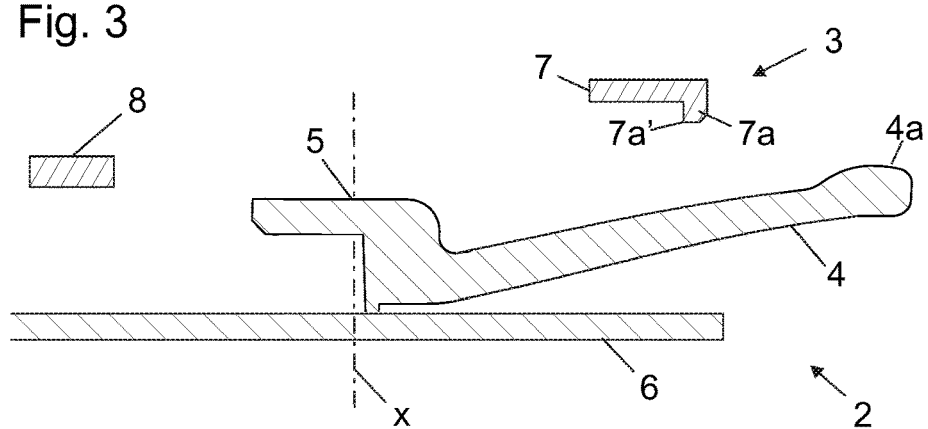
FIGS. 3-6 illustrate partial views of preferred cross-sectional details of the push-button equipment of FIGS. 1 and 2 at different stages of installation.

FIG. 3 illustrates the pressel 2 and the collar 3 prior to inserting the pressel 2 into the seat of the collar 3.

Figure 4:
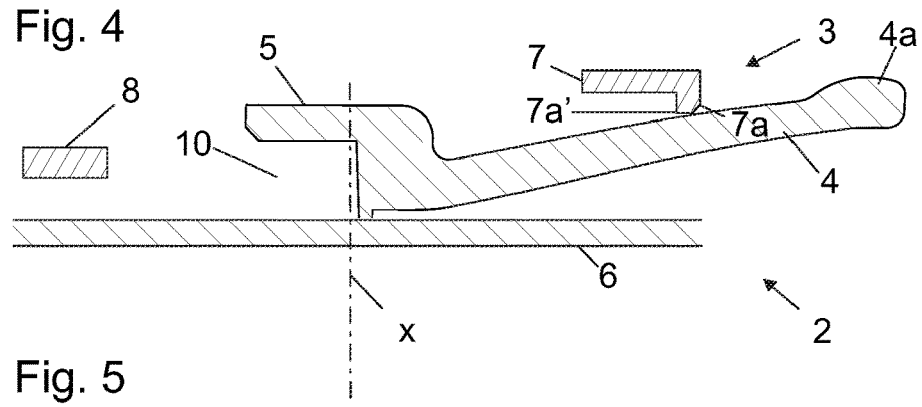

FIG. 4 illustrates the pressel 2 and the collar 3 after the pressel 2 has been inserted my moving it in direction orthogonal to the pressing face 6 into the seat s of the collar 3. The direction in which the pressel is moved in said inserting is referred to as forward direction in the application. When the pressel 2 is in the seat s of the collar 3, the first locking member 5 is deeper in direction of said rotational axis x in the seat s than the second locking member (8, and movable by rotation of the pressel to be positioned in direction of said rotational axis (x) behind the second locking member 8.

Figure 5:
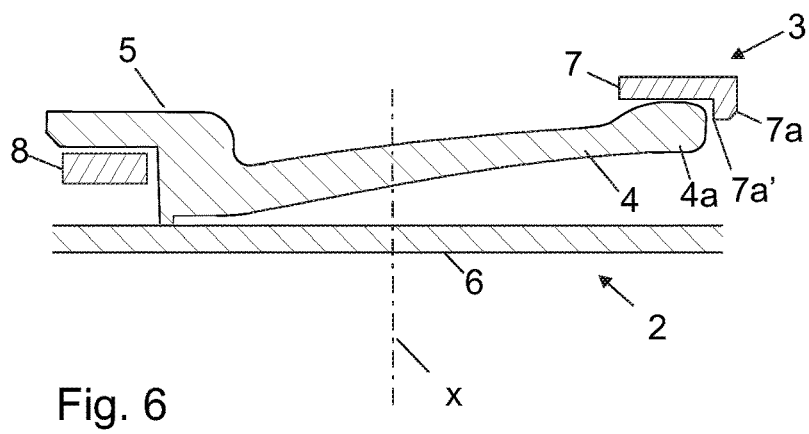

FIG. 5 illustrates the pressel 2 and the collar 3 after the pressel 2 has been rotated in the seat to a locked position around the rotational axis x extending in direction orthogonal to the pressing face 6. In this locking position the first locking member 5 is positioned in direction of said rotational axis x behind the second locking member 8, whereby in said locked position the second locking member 8 blocks the pressel 2 from moving in backwards direction orthogonal to the pressing face 6 out from the seat.

Figure 6:
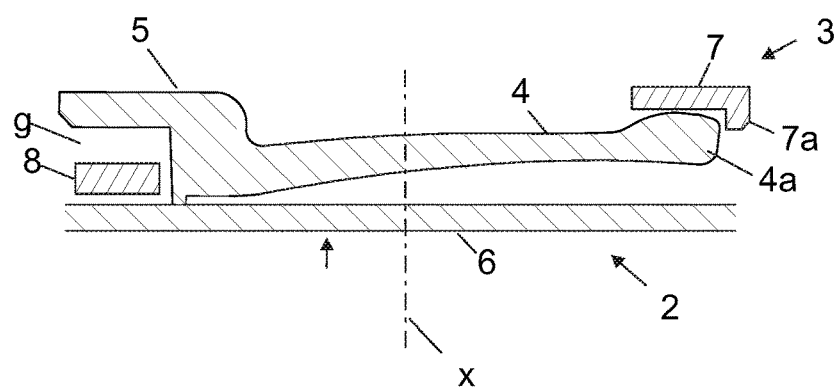

Thickness of the second locking member 8 in forward direction orthogonal to the pressing face 6 is smaller than the free space on the side of the first locking member 5 towards which the pressing face 6 faces. Thereby, the pressel 2 is movable in the seat s when said locked position further in said forward direction without being blocked by the second locking member 8. Thereby, the pressel 2 can be pressed in said forward direction to actuate an electrical switch (not showed), and particularly to displace a contact member of an electrical switch. When the pressel 2 is in the locked position, it is movable in particular by press of a user on the pressing face, in the seat s in forward direction orthogonal to the pressing face 6. FIG. 6 illustrates the pressel 2 and the collar 3 when the pressel 2, in particular the pressing face 6 thereof, is pressed by a user in said forward direction. The slot 10 being larger in the forward direction orthogonal to the pressing face 6 than the second locking member 8, in said pressing, a gap g between the first and second locking member 5, 8 is enlarged on the same side of the first locking member 5 as the pressing face 6 in direction orthogonal to the pressing face 6. In said pressing the returning spring is further tensioned and bent against the counterpart member 7.

FIGS. 1 and 3-6 moreover illustrate the preferred feature that the push-button equipment, in particular the pressel 2 thereof, comprises a returning spring 4 for returning the pressel 2 in backwards direction orthogonal to the pressing face after the pressel 2 has been pressed by a user. The backwards direction is opposite to the forward direction. The push-button equipment is arranged to operate such that when the pressel 2 is in the locked position, the pressel 2 is movable, in particular by press of a user on the pressing face 6, in the seat s in forward direction orthogonal to the pressing face 6 such that the returning spring 4 is elastically deformed, and in backwards direction orthogonal to the pressing face returned by the returning spring 4. The returning spring 4 is preferably comprised in the pressel 2 as presented in Figures. This is preferable, however not necessary, since alternatively it could be comprised in the collar 3 or be a component separate from the collar 3 and the pressel 2.

In the presented embodiments, the mounting collar 3 comprises a counterpart member 7 for the returning spring 4 comprised in the pressel 2 against which the returning spring 4 is tensionable by movement in said forward direction when the pressel 2 is in the locked position.

As illustrated, the returning spring 4 is preferably a bendable tongue, tensionable by bending against said counterpart member 7 of the mounting collar 3.

The preferred embodiments moreover show the preferred, although not necessary, further feature that the collar 3 is arranged to block rotation of the pressel 2 around said rotational axis x back from the locked position. For this purpose, in the preferred embodiments presented, the spring 4 comprises a distal end 4a, and the counterpart member 7 comprises an abutment 7a against which the spring 4 is arranged to slide in a tensioned state in said rotation of the pressel 2 into a locked position around said rotational axis x at least until the distal end 4a bypasses an edge 7a' of the abutment 7a in direction of said sliding, bypassing of said edge 7a' being arranged to allow release of the distal end 4a of the spring 4 to bypass said edge 7a' of the abutment 7a in said forward direction to be aligned with the abutment 7a, in particular in tangential direction of the a rotational axis x, such that rotation of the spring 4 (and thereby the pressel) in reverse direction is blocked.

The returning spring 4 can also be made tensionable by movement in said forward direction in said inserting, which is advantageous since the tension produced in said inserting can be effectively utilized in delimiting the aforementioned rotation to be one-way rotation.

The structure of the returning spring 4 is more specifically preferably such that it is a curved bendable tongue extending around said rotational axis x, preferably with a constant center of curvature, wherein the center of curvature is at the point of said rotational axis x. This is implemented preferably such that the returning spring 4 is a bendable tongue helically extending around said rotational axis x. Preferably, the returning spring 4 extends around said rotational axis x an angle which is between 20 and 180 degrees, preferably between 20 and 90 degrees, most preferably between 30 and 70 degrees. Thus, the pressel 2 can be simply designed to comprise plurality of said springs 4, and the structure thereof can be made elastic enough. In the preferred embodiment, the pressel comprises plurality, preferably 2-5 of said first locking members 5 and springs 4 cooperating with the corresponding number of second locking members 8 and counterpart members 7, respectively, comprised in the collar 3.

Hereinafter, preferred details of the pressel 2 are described. The pressel 2 is illustrated in FIGS. 1-7. The pressel 2 is preferably particularly such that it comprises a pressing face 6 for receiving a press of a user, a first locking member 5, and a slot 10 on the same side of the first locking member 5 as the pressing face 6 in direction of a rotation axis x extending in the direction orthogonal to the pressing face 6, which slot 10 is open towards tangential direction of the a rotational axis x extending in direction orthogonal to the pressing face 6, the slot 10 being thereby provided for receiving a second locking member 8 comprised in the mounting collar 3. The pressel 2 is suitable for being inserted in a seat s of a mounting collar 3 in forward direction orthogonal to the pressing face 6, and movable in the seat into a locked position by rotating it in the seat s around a rotational axis x extending in said direction orthogonal to the pressing face 6.

The pressel 2 comprises a returning spring 4. The returning spring 4 is an bendable tongue, tensionable by bending. The returning spring 4 is a curved bendable tongue extending around said rotational axis x, preferably with a constant center of curvature, wherein the center of curvature is at the point of said rotational axis x. Particularly, the returning spring 4 is a bendable tongue helically extending around said rotational axis x. Preferably, the pressel is made of plastic or at least comprises plastic. Preferably, at least the spring 4 of the pressel is made of plastic. The pressel 2 can be a one-piece structure made of plastic, but the pressel 2 can of course alternatively be made of metal or a combination of materials such as metal and plastic. The pressing face 6 is preferably planar or at least substantially planar. It is not necessary that the pressel 2 is a one-piece structure, since the pressel 2 can comprise plurality of parts fixed to each other.

Figure 7:
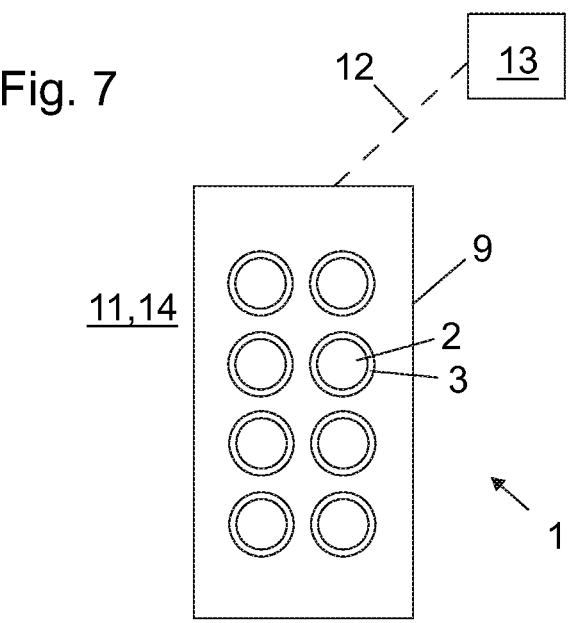
FIG. 7 illustrates a push-button arrangement according to a preferred embodiment.

FIG. 7 illustrates a push-button arrangement 1 comprising a push-button equipment as described above. The mounting collar 3 has been installed immovably on a base 9, which is in this case a button panel, the pressel 2 being in the seat of the mounting collar 3 and the pressel 2 in the locked position, wherein in said locked position the collar blocks the pressel 2 from moving in backwards direction orthogonal to the pressing face 6 out from the seat. The base is preferably a button panel 9 of an elevator, preferably installed on a wall 11 of the elevator, which wall is a wall of an elevator car or a wall of an elevator landing. Alternatively, the button panel 9 is installed on a stand 14 mounted on an elevator landing. The push button arrangement is preferably connected over an electrical, wired or wireless, connection 12 with the elevator control unit 13 configured to control movement of the elevator car based on state of the push buttons.

The push button mentioned in the application is preferably a push-button for actuating an electric switch. In the aforementioned arrangement, the arrangement comprises an electric circuit and an electric switch component actuatable to break or connect an electric circuit, and the pressel 2 is arranged to actuate the electric switch component. The arrangement preferably, although not necessarily, moreover comprises a light source, such as a LED component, arranged to radiate light outside the push-button, preferably through the collar and/or the pressel. Then, it is preferable that pressel and/or the collar is, or at least comprises, a transparent portion which is visible to the user and which can be illuminated by the light source.

The collar 3 is preferably a ring around the pressel 2. The seat preferably has inner wall w that is circular or at least substantially circular when viewed in said forward direction orthogonal to the pressing face 6. The inner wall w can have protrusions protruding towards the center of the circular shape forming the second locking member 8 and the counterpart member 7, for instance.

The perimeter of the pressing face 6 is preferably circular when viewed in said forward direction orthogonal to the pressing face 6, which facilitates making a structure that is rotatable in a seat s during installation, and pressable such that the pressing face 6 can partially or completely move into the seat s in forward direction orthogonal to the pressing face 6 when pressed by a user. However, circular perimeter is not necessary since the pressing face 6 need not extend into the seat s and thereby it could also have some other shape than the parts located within the seat s.

In the preferred embodiments presented, the pressel 2 is insertable in the seat s of the mounting collar 3 in forward direction orthogonal to the pressing face 6 without tilting the pressel 2 relative to the mounting collar 3, and thereafter movable in the seat s into the locked position by rotating it in the seat s around the rotational axis x extending in said direction orthogonal to the pressing face 6 without tilting the pressel 2 relative to the mounting collar 3. This is advantageous, since thereby the pressel 2 can be installed in the mounting collar 2 without tilting the pressel 2 relative to the mounting collar 3.

In the application, term pressel is used for the part of a push button equipment that comprises the pressing face for receiving a press of a user. Also other terms may exist for this part of a push button equipment.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A push-button equipment comprising:
   a pressel; and
   a mounting collar for being installed on a base, the mounting collar comprising a seat for receiving the pressel,
   wherein the pressel comprises:
      a pressing face for receiving a press of a user; and
      a returning spring on an outer circumferential surface of the pressel and extending in a circumferential direction for returning the pressel in a backwards direction orthogonal to the pressing face after the pressel has been pressed by a user,
   wherein the pressel is insertable in the seat of the mounting collar in a forward direction orthogonal to the pressing face, and
   wherein the pressel is movable in the seat into a locked position by rotating the pressel in the seat around a rotational axis extending in said direction orthogonal to the pressing face, and wherein in said locked position the mounting collar blocks the pressel from moving in backwards direction orthogonal to the pressing face out from the seat.

2. The push-button equipment according claim 1, wherein the mounting collar is arranged to block rotation of the pressel around said rotational axis back from the locked position.

3. The push-button equipment according to claim 1, wherein the pressel comprises a first locking member, and the mounting collar comprises a second locking member, and the pressel inserted in the seat is rotatable in the seat to a locked position around the rotational axis extending in the direction orthogonal to the pressing face, such that the first locking member rotates to be positioned in a direction of said rotational axis behind the second locking member, whereby in said locked position the second locking member blocks the pressel from moving in the backwards direction orthogonal to the pressing face out from the seat.

4. The push-button equipment according to claim 1, wherein when the pressel is in the locked position, it is movable by press of a user on the pressing face, in the seat in the forward direction orthogonal to the pressing face such that the returning spring is elastically deformed, and in the backwards direction orthogonal to the pressing face returned by the returning spring.

5. The push-button equipment according to claim 1, wherein the mounting collar comprises a counterpart member for the returning spring against which the returning spring is tensionable by movement in said forward direction.

6. The push-button equipment according to claim 1, wherein the returning spring is a bendable tongue, tensionable by bending, against said counterpart member.

7. The push-button equipment according to claim 1, wherein the returning spring is in said rotation arranged to slide against said counterpart member in a tensioned state.

8. The push-button equipment according to claim 1, wherein the returning spring comprises a distal end, and the counterpart member comprises an abutment against which the returning spring is arranged to slide in said rotation in a tensioned state at least until the distal end bypasses an edge of the abutment in a direction of said sliding, said bypassing of said edge being arranged to allow release of the distal end of the returning spring to bypass said edge of the abutment in said forward direction to be aligned with the abutment such that rotation of the spring in a reverse direction is blocked.

9. The push-button equipment according to claim 1, wherein the returning spring is a bendable tongue helically extending around said rotational axis.

10. The push-button equipment according to claim 3, wherein the pressel comprises a slot on the same side of the first locking member as the pressing face in the direction of a rotation axis extending in the direction orthogonal to the pressing face, which slot is open towards a tangential direction of the a rotational axis extending in the direction orthogonal to the pressing face, the slot being thereby provided for receiving the second locking member, the slot being larger in the forward direction orthogonal to the pressing face than the second locking member.

11. A pressel for the push-button equipment as defined in claim 1, wherein the pressel comprises:
   the pressing face for receiving a press of a user;
   the returning spring;
   a first locking member; and
   a slot on the same side of the first locking member as the pressing face in a direction of the rotation axis extending in the direction orthogonal to the pressing face, which slot is open towards tangential direction of the rotational axis extending in the direction orthogonal to the pressing face, the slot being thereby provided for receiving a second locking member comprised in the mounting collar.

12. The pressel according to claim 11, wherein the pressel is suitable for being inserted in a seat of a mounting collar in a forward direction orthogonal to the pressing face, and movable in the seat into a locked position by rotating the pressel in the seat around the rotational axis extending in said direction orthogonal to the pressing face.

13. A push-button arrangement comprising the push-button equipment according to claim 1, wherein the mounting collar is installed on a base, the pressel being in the seat of the mounting collar, and the pressel being in the locked position, wherein in said locked position the mounting collar blocks the pressel from moving in the backwards direction orthogonal to the pressing face out from the seat.

14. The push-button equipment according to claim 2, wherein the pressel comprises a first locking member, and the mounting collar comprises a second locking member, and the pressel inserted in the seat is rotatable in the seat to a locked position around the rotational axis extending in the direction orthogonal to the pressing face, such that the first locking member rotates to be positioned in a direction of said rotational axis behind the second locking member, whereby in said locked position the second locking member blocks the pressel from moving in the backwards direction orthogonal to the pressing face out from the seat.

15. The push-button equipment according to claim 2, wherein when the locked position, the pressel is movable by press of a user on the pressing face, in the seat in the forward direction orthogonal to the pressing face such that the returning spring is elastically deformed, and in the backwards direction orthogonal to the pressing face returned by the returning spring.

16. A push-button equipment according to claim 3, wherein when the pressel is in the locked position, the pressel is movable by press of a user on the pressing face, in the seat in the forward direction orthogonal to the pressing face such that the returning spring is elastically deformed, and in the backwards direction orthogonal to the pressing face returned by the returning spring.

* * * * *